No. 802,651. PATENTED OCT. 24, 1905.
G. T. MEADON.
DUST COLLECTOR.
APPLICATION FILED SEPT. 28, 1904.
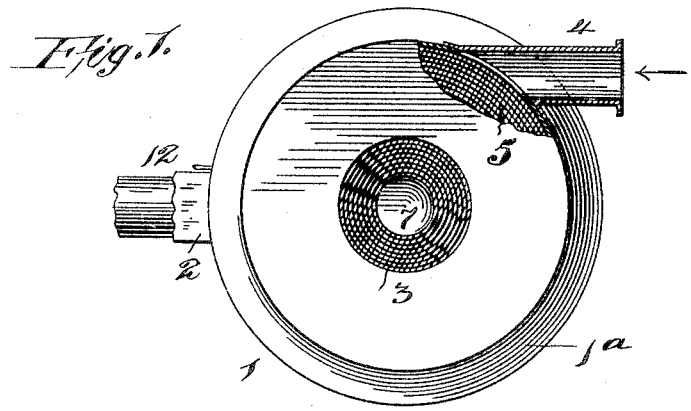
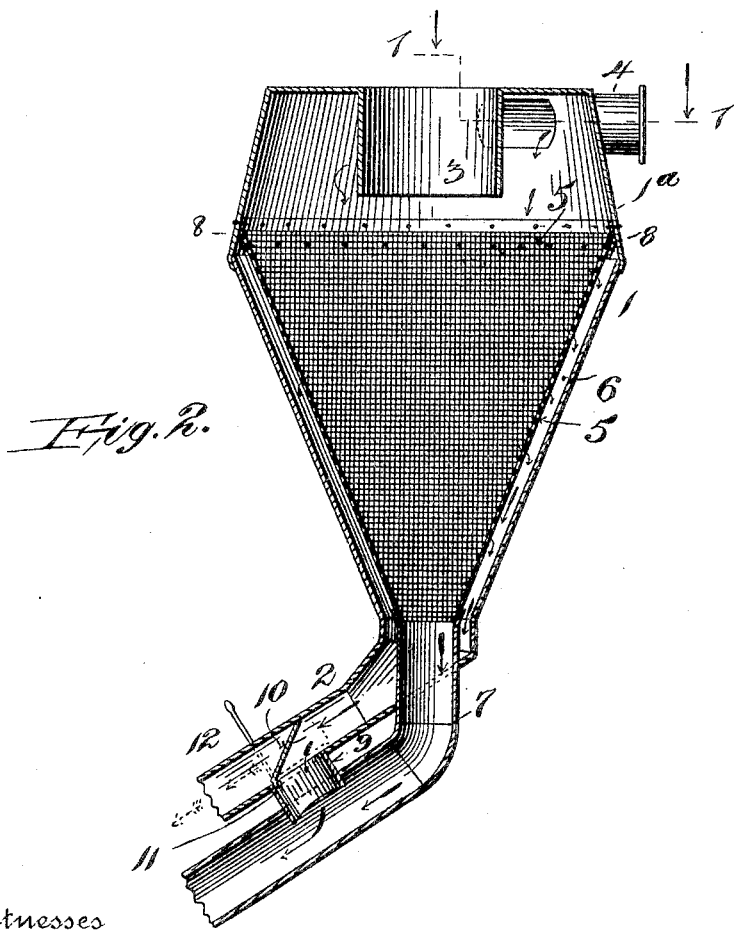
Witnesses
C. W. Benjamin
M. Hollingshead
Inventor
G. T. Meadon.
By his Attorney
T. F. Bourne

UNITED STATES PATENT OFFICE.

GEORGE T. MEADON, OF NEW YORK, N. Y.

DUST-COLLECTOR.

No. 802,651.     Specification of Letters Patent.     Patented Oct. 24, 1905.

Application filed September 28, 1904. Serial No. 226,266.

*To all whom it may concern:*

Be it known that I, GEORGE T. MEADON, a citizen of the United States, residing in New York city, borough of Brooklyn, State of New York, have invented certain new and useful Improvements in Dust-Collectors, of which the following is a specification.

My invention relates to improvements in the class of dust-collectors into which air laden with dust, sawdust, and the like is blown and wherein by reason of the whirling motion given to the air the dust is caused to fall away below and the purified air to rise from the collector.

The object of my invention is to provide improved means for causing the separation of smaller from larger particles, such as the separation of sawdust from shavings and the like when the mingled sawdust and shavings are blown into the collector.

In carrying out my invention I provide a separating-chamber having a tapering or conical peripheral wall with an outlet above for the purified air, and within said tapering chamber I place a screen substantially corresponding in shape to the wall of the chamber and located at a distance from said wall, providing a space between the chamber-wall and screen communicating with an outlet below, the screen also communicating with a lower outlet, the upper portion of the screen or a flange attached thereto being brought into contact with the wall of the separating-chamber on a plane substantially parallel with the wall of the screen, whereby dust, &c., will be kept from lodging at the joint between the screen and the chamber-wall and the dust and other particles will be caused to pass into the screen, the finer particles being forced through the screen into the space between the wall of the chamber and the screen and the heavier particles, such as shavings, being caused to pass down through the screen to its outlet.

Reference is to be had to the accompanying drawings, in which—

Figure 1 is a plan view of a dust-collector embodying my invention, partly in section, on the line 1 1 in Fig. 2; and Fig. 2 is a vertical central section thereof.

In the accompanying drawings the numeral 1 indicates a separating-chamber, which is shown provided with a lower tapering or conical portion having an outlet connected with a discharge-pipe 2 and an upper inwardly-tapering or conical portion 1ª, provided with an air-outlet 3 and an inlet-pipe 4, arranged tangentially to the chamber. The foregoing parts may be of any suitable or well-known construction. Within the lower tapering portion of chamber 1 I provide a tapering screen 5, which is located at a distance from the wall of chamber 1, so as to provide a space 6, that is in communication with the outlet-pipe 2. The lower end of the screen 5 communicates with an outlet-pipe 7, which is shown passing through the pipe 2, so there may be independent deliveries from the screen 5 and space 6. The upper edge of screen 5 is brought into contact with the wall of chamber 1ª on a line substantially parallel with the periphery of screen 5, so as to make a close joint with the wall 1ª to prevent dust and other particles from lodging at the point of connection between the screen and the wall of the chamber. In practice I find it advantageous to secure a band 8 to the upper edge of the screen, which band rests snugly against the wall 1ª and may be bent or beveled to make a close fit to said wall. By having the band 8 attached to the screen I am also enabled to firmly secure the band to wall 1ª, as by bolts or rivets, to make a firm support for the screen.

In using my improved collector the air laden with dust, sawdust, shavings, or other particles to be separated from the air is blown into the collector through pipe 4 and assumes a whirling motion therein, and as the particles descend they must first pass into screen 5, whereby the smaller particles, such as sawdust, will be driven through the mesh of the screen into the space 6, from whence they will pass into pipe 2, and the heavier particles, such as shavings, will pass directly from within screen 5 into pipe 7. By this means I am not only enabled to separate dust, &c., from air, but by the same operation separate larger and smaller particles from each other, as may be desired.

In case it is desired to deliver from the collector the sawdust and shavings without separating them I provide a tube or pipe 9, that connects the pipes 2 and 7, and apply a damper or valve 10 in pipe 2, which is pivotally supported, as at 11, and provided with a handle 12, whereby when valve 10 is turned down, as in dotted lines in Fig. 2, to close the passage 9 a separate delivery of the sawdust and shavings may be made from pipes 2 and 7; but when valve 10 is raised, as in Fig. 2, the finer particles or sawdust, although having been separated from the shavings by means of screen 5, will pass back into pipe 7 and be delivered together.

Having now described my invention, what I claim is—

1. A dust-collector comprising a chamber having a lower downwardly-tapering peripheral wall and an upwardly-extending inwardly-tapering upper wall, an inlet communicating with the upwardly-tapering portion of the chamber, a screen within the downwardly-tapering portion of the chamber located at a distance from the wall of said chamber providing a space between said wall and screen, and outlet-pipes extending respectively from said space and from the lower portion of said screen, a tube connecting said pipes, and a valve to control the passage through said tube for permitting the separate delivery of sawdust and shavings through the two pipes or the delivery of mingled sawdust and shavings through one pipe.

2. A dust-collector comprising a chamber having a lower downwardly-tapering peripheral wall, and an upper wall provided with an inlet-pipe arranged tangentially to the chamber, a screen within the chamber located at a distance from the wall thereof providing a space between said wall and screen, an outlet-pipe extending from the chamber, an outlet-pipe extending from the screen, a tube connecting said pipes, and a valve to control the passage through said tube for permitting the delivery of sawdust and shavings separately from said pipes, or the delivery of mingled sawdust and shavings through one of said pipes, substantially as described.

GEORGE T. MEADON.

Witnesses:
T. F. BOURNE,
M. HOLLINGSHEAD.